United States Patent
Worley

(10) Patent No.: US 9,947,157 B1
(45) Date of Patent: Apr. 17, 2018

(54) APPLIANCE OVERRIDE KEY

(71) Applicant: Haier US Appliance Solutions, Inc., Wilmington, DE (US)

(72) Inventor: Mark William Thomas Worley, Louisville, KY (US)

(73) Assignee: HAIER US APPLIANCE SOLUTIONS, INC., Wilmington, DE (US)

( * ) Notice: Subject to any disclaimer, the term of this patent is extended or adjusted under 35 U.S.C. 154(b) by 0 days.

(21) Appl. No.: 15/478,383

(22) Filed: Apr. 4, 2017

(51) Int. Cl.
G07C 9/00 (2006.01)
G07F 9/02 (2006.01)
G06F 21/31 (2013.01)

(52) U.S. Cl.
CPC ......... *G07C 9/00142* (2013.01); *G07F 9/026* (2013.01); *G06F 21/31* (2013.01); *H04L 2209/56* (2013.01)

(58) Field of Classification Search
CPC ..... G07C 9/00142; G06F 21/31; G06F 21/10; G06F 21/33; H04L 2209/56; H04L 2463/101; H04L 2463/102; G07F 9/026
See application file for complete search history.

(56) References Cited

U.S. PATENT DOCUMENTS

| | | | |
|---|---|---|---|
| 4,609,780 A * | 9/1986 | Clark | G07C 9/00023 235/382 |
| 6,157,313 A * | 12/2000 | Emmermann | G08B 5/223 340/12.54 |
| 6,504,480 B1 * | 1/2003 | Magnuson | G07C 9/00142 340/5.1 |
| 7,234,062 B2 | 6/2007 | Daum et al. | |
| 7,840,437 B2 * | 11/2010 | Lewis | G06Q 30/0225 705/14.26 |
| 7,987,540 B2 | 8/2011 | Schroeder et al. | |
| 8,326,358 B2 * | 12/2012 | Runstedler | G06F 3/0233 340/5.54 |
| 8,330,584 B1 * | 12/2012 | Pfanstiehl | H04N 21/4221 200/43.01 |
| 8,456,276 B2 * | 6/2013 | Dai | H04N 21/4221 340/3.71 |
| 8,769,426 B2 | 7/2014 | Brian et al. | |
| 9,047,005 B2 * | 6/2015 | Hill | G06F 1/1654 |
| 9,160,743 B2 | 10/2015 | Anantharaman | |

(Continued)

FOREIGN PATENT DOCUMENTS

WO WO2016078371 A1 5/2016

OTHER PUBLICATIONS

Partial English machine translation of WO 2016/078371 (non-translated document provided by applicant), Gree Electric Appliances, Inc. (CN); published on May 26, 2016; pp. 1-38.*

*Primary Examiner* — Brian Miller
(74) *Attorney, Agent, or Firm* — Dority & Manning, P.A.

(57) ABSTRACT

A method of operating an appliance includes enabling an operation restriction. The operation restriction limits activation of the appliance and requires an authorization prior to activating the appliance. The method also includes receiving a request to activate the appliance. The method further includes receiving an override key via a user interface physically connected to the appliance. The method further includes disabling the operation restriction after the override key is received, and activating the appliance after the override key is received.

17 Claims, 5 Drawing Sheets

(56) References Cited

U.S. PATENT DOCUMENTS

| | | | | |
|---|---|---|---|---|
| 9,503,902 B1* | 11/2016 | Coney | | H04W 12/08 |
| 9,507,330 B2* | 11/2016 | Nagamatsu | | G05B 15/02 |
| 9,742,581 B2* | 8/2017 | Satanek | | H04L 12/2803 |
| 2003/0043016 A1* | 3/2003 | Kady | | G07C 9/00142 |
| | | | | 340/5.1 |
| 2003/0046592 A1* | 3/2003 | Woodruff | | H04N 5/76 |
| | | | | 726/19 |
| 2004/0046018 A1* | 3/2004 | Dobbins | | G07C 9/00142 |
| | | | | 235/382.5 |
| 2004/0177072 A1* | 9/2004 | Salminen | | G07C 9/00111 |
| 2005/0165612 A1* | 7/2005 | Van Rysselberghe | | A47G 29/141 |
| | | | | 705/26.1 |
| 2006/0015580 A1* | 1/2006 | Gabriel | | H04N 7/17309 |
| | | | | 709/219 |
| 2006/0077038 A1* | 4/2006 | Hopkins | | G07C 9/00142 |
| | | | | 340/5.73 |
| 2006/0237427 A1* | 10/2006 | Logan | | E05B 47/0002 |
| | | | | 219/401 |
| 2009/0328203 A1* | 12/2009 | Haas | | G06F 21/6218 |
| | | | | 726/20 |
| 2010/0191352 A1* | 7/2010 | Quail | | H04L 12/2809 |
| | | | | 700/90 |
| 2011/0296313 A1* | 12/2011 | Gaxiola | | G08C 17/02 |
| | | | | 715/744 |
| 2012/0161926 A1* | 6/2012 | You | | G06F 3/0488 |
| | | | | 340/5.54 |
| 2013/0041951 A1* | 2/2013 | Lee | | G05B 15/02 |
| | | | | 709/204 |
| 2014/0067131 A1 | 3/2014 | Park et al. | | |
| 2014/0156081 A1* | 6/2014 | Ha | | D06F 33/02 |
| | | | | 700/275 |
| 2016/0012218 A1* | 1/2016 | Perna | | G06K 9/0061 |
| | | | | 726/18 |

* cited by examiner

APPLIANCE OVERRIDE KEY

FIELD OF THE INVENTION

The present subject matter relates generally to household appliances, and related methods of controlling or restricting usability of household appliances.

BACKGROUND OF THE INVENTION

Household appliances may have undesirable effects when the appliances are operated improperly. For example, such undesirable effects may occur when household appliances are operated by someone who is unfamiliar with correct procedures for operating the appliances and/or who lacks the requisite physical or mental capacity to use the appliances safely.

Accordingly, some appliances permit the primary user to prevent or limit other users' ability to operate the appliances. However, in some instances it may be useful to override such limitations.

BRIEF DESCRIPTION OF THE INVENTION

A method of operating an appliance includes enabling an operation restriction. The operation restriction limits activation of the appliance and requires an authorization prior to activating the appliance. The method also includes receiving a request to activate the appliance. The method further includes receiving an override key via a local user interface. The method further includes disabling the operation restriction after the override key is received, and activating the appliance after the override key is received. Additional aspects and advantages of the invention will be set forth in part in the following description, or may be obvious from the description, or may be learned through practice of the invention.

In one aspect of the present disclosure, a method of operating an appliance is provided. The method includes enabling an operation restriction. The operation restriction limits activation of the appliance and requires an authorization prior to activating the appliance. The method also includes receiving a request to activate the appliance. The method further includes receiving an override key via a local user interface. The method further includes disabling the operation restriction after the override key is received, and activating the appliance after the override key is received.

In another aspect of the present disclosure, an appliance is provided. The appliance further includes a controller in operative communication with the user interface. The controller includes a memory. The controller is configured to receive a restriction command, store an override key in the memory, and enable an operation restriction. The operation restriction limits activation of the appliance and requires an authorization prior to activating the appliance. The controller is also configured to receive the override key from a local user interface, disable the operation restriction/s after the override key is received, and activate the appliance after the override key is received.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
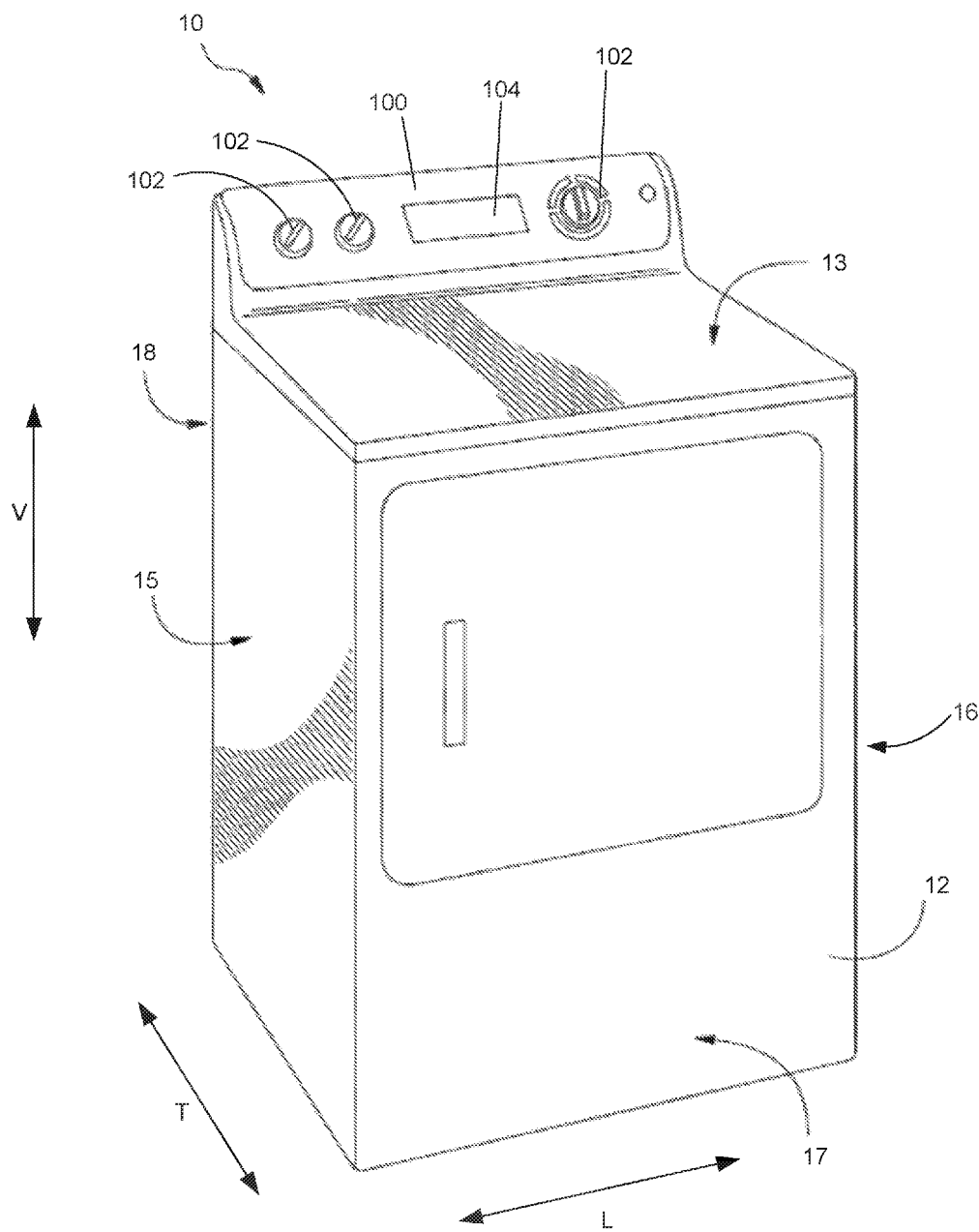
FIG. 1 provides a perspective view of a dryer appliance in accordance with an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Features of the present disclosure may be provided with any household appliance where desired. For example and without limitation, the following description refers to several possible example appliances, as set forth in more detail below. Additional and further example appliances which may include features of the present disclosure are also possible, including but not limited to a water heater, water filter or purifier, an air conditioner, or a space heater, among many other examples.

As may be seen in FIGS. 1 through 4, in accordance with one or more embodiments of the present subject matter, an appliance 10 having a cabinet 12 is provided. The cabinet 12 defines a vertical direction V, a lateral direction L, and a transverse direction T that are mutually perpendicular. The cabinet 12 extends between a top portion 13 and a bottom portion 14 along the vertical direction V. Cabinet 12 also extends between a first side portion 15 and a second side portion 16, e.g., along the lateral direction L, and a front portion 17 and a back portion 18, e.g., along the transverse direction T.

In the particular example of FIG. 1, the appliance 10 may be a laundry appliance, e.g., the appliance may be a dryer 10. While described in the context of a specific embodiment of dryer appliance 10, using the teachings disclosed herein, it will be understood that dryer appliance 10 is provided by way of example only. Other dryer appliances having different appearances and different features may also be utilized with the present subject matter as well.

The exemplary dryer appliance 10 of FIG. 1 may include a drum or container (not shown) mounted within the cabinet 12 for rotation about a substantially horizontal axis. The drum may define a chamber for receipt of articles, e.g., clothing, for drying. The drum is also in fluid communication with a heating assembly or system, such as via a supply duct that receives heated air from the heating assembly. For example, the heating assembly may include a heating element, such as a gas burner, an electrical resistance heating element, or heat pump, for heating air. The particular structure of the drum and heating system are understood by those of skill in the art and are not described in further detail herein.

Figure 2:
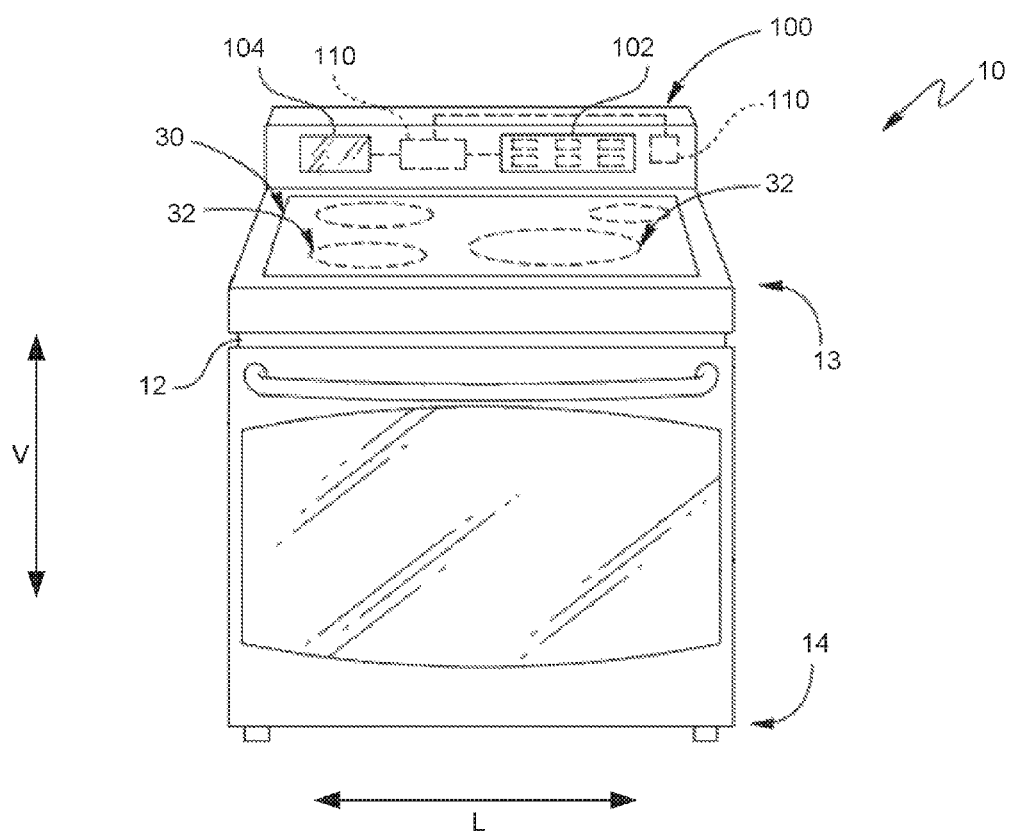
FIG. 2 provides a perspective view of an oven appliance in accordance with an example embodiment of the present disclosure.

FIG. 2 illustrates another example embodiment of the appliance 10, wherein the appliance 10 is an oven appliance including a cooktop and an oven. The exemplary oven appliance 10 illustrated in FIG. 2 includes user interface panel 100 and user input device 102. In the illustrated example of FIG. 2, the user input device 102 is a touch screen interface. Oven appliance 10 is provided by way of example only and is not intended to limit the present subject matter in any aspect. Thus, the present subject matter may be used with other oven appliance configurations, e.g., that define one or more interior cavities for the receipt of food and/or having different heating element arrangements than what is shown in FIG. 2. Further, the present subject matter may be used in a stand-alone cooktop, a hot plate, or any other suitable appliance.

As illustrated in FIG. 2, the exemplary oven appliance 10 generally includes a cooking assembly. The cooking assembly may include one or more heating elements. For example, in some embodiments, the cooking assembly, and thus the oven appliance 10 includes cabinet 12 which in some embodiments may be an insulated cabinet 12 with an interior cooking chamber (not shown) configured for the receipt of one or more food items to be cooked defined within insulated cabinet 12. Such cooking chambers are generally understood by those of ordinary skill in the art and are not described in further detail herein. The oven appliance 10 may additionally include a cooktop 30. Cooktop 30 may be disposed on the cabinet 12 generally at or proximate to top portion 13. Cooktop 30 includes one or more heating assemblies 32, e.g., electric heating elements or gas burners, thereon.

Figure 3:
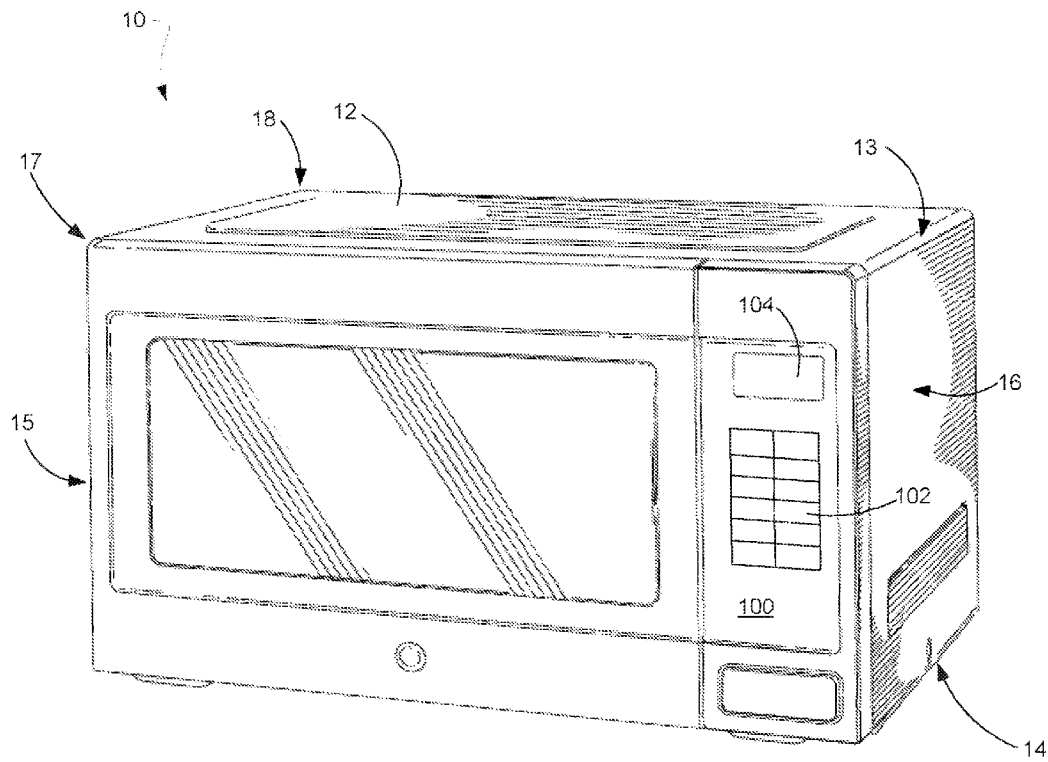
FIG. 3 provides a perspective view of a microwave oven appliance in accordance with an example embodiment of the present disclosure.
Figure 3:
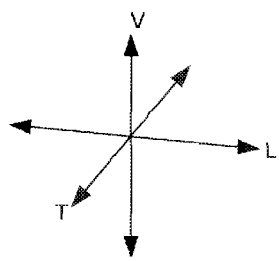

In another example embodiment, the appliance 10 may be a microwave oven appliance, such as is illustrated in FIG. 3. It should be understood that microwave oven appliance 10 is provided by way of example only. Thus, the present subject matter is not limited to microwave oven appliance 10 and may be utilized in any suitable appliance.

Microwave oven appliance 10 includes a cabinet 12. A cooking chamber is defined within the cabinet 12 of the microwave 10. Microwave 10 of FIG. 3 is configured to heat articles, e.g., food or beverages, within the cooking chamber using electromagnetic radiation. Microwave appliance 10 may include various components which operate to produce the electromagnetic radiation, as is generally understood. For example, microwave appliance 10 may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

Figure 4:
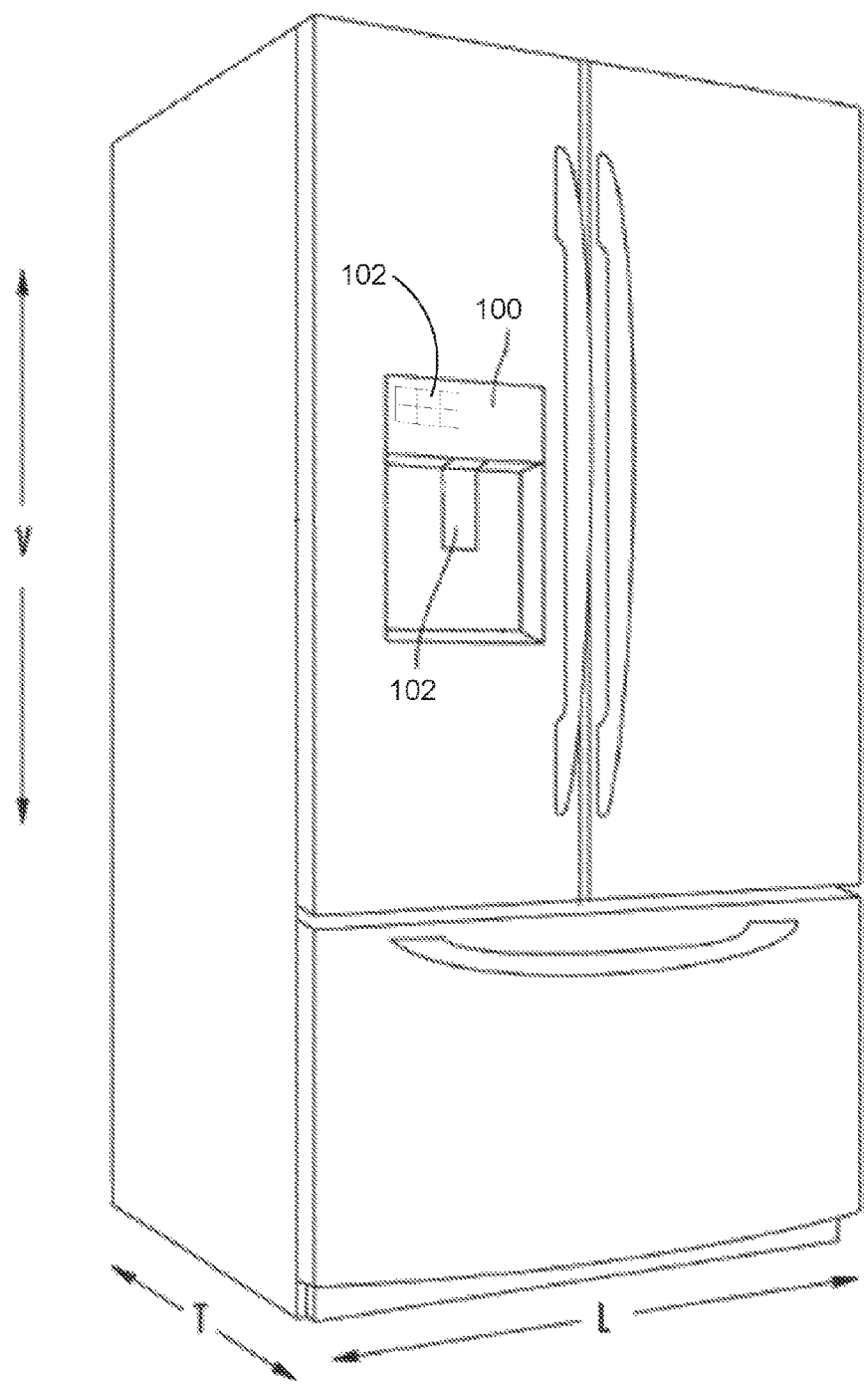
FIG. 4 provides a perspective view of a refrigeration appliance in accordance with an example embodiment of the present disclosure.

In another example embodiment, the appliance 10 may be a refrigeration appliance, such as is illustrated in FIG. 4. Refrigerator appliance 10 is generally referred to as a bottom-mount refrigerator appliance. It should be understood that refrigeration appliance 10 is provided by way of example only. Thus, the present subject matter is not limited to refrigeration appliance 10 and may be utilized in any suitable appliance.

Still referring to FIG. 4, the refrigeration appliance may include a dispenser 100, which may be configured to dispense cold water, hot water, and/or ice. As illustrated, dispenser may include a dispenser recess defined on one of the refrigerator doors. The dispenser may include one or more outlets for dispensing ice, chilled liquid water, and/or heated liquid water. Dispenser may, for example, include a paddle mounted below the one or more outlets. As illustrated, a single paddle may be provided in connection with a control panel or user interface for controlling the mode of operation of dispenser, e.g., for selecting chilled liquid water, heated liquid water, crushed ice, and/or whole ice. User interface panel may include a chilled water dispensing button (not labeled), an ice-dispensing button (not labeled) and a heated water dispensing button (not labeled) for selecting between chilled liquid water, ice, and heated liquid water, respectively. The particular structure and operation of the refrigerator and dispensing system are understood by those of skill in the art and are not described in further detail herein.

According to various embodiments of the present disclosure, the appliance 10 may take the form of any of the examples described above, or may be any other household appliance where the ability to remotely monitor or restrict usage of the appliance is desired. Thus, it will be understood that the present subject matter is not limited to any particular appliance.

Referring again to the various embodiments illustrated in FIGS. 1 through 4, a user interface panel 100 and a user input device 102 may be positioned on an exterior of the cabinet 12. The user input device 102 is generally positioned proximate to the user interface panel 100, and in some embodiments, the user input device 102 may be positioned on the user interface panel 100. Generally, the appliance 10 may include a controller 110 in operative communication with the user input device 102. One or more user input devices 102, such as knobs, buttons, touchscreen interfaces, etc., may be provided or mounted on the user interface panel 100. Signals generated in controller 110 operate appliance 10 in response to user input via the user input devices 102. In the example illustrated in FIG. 1, a plurality of user input devices 102 are provided as knobs. In the example illustrated in FIG. 2, user input device 102 is provided as a touch screen type interface. As a further example illustrated in FIG. 3, user input devices 102 are provided as a touch pad. In the example illustrated in FIG. 4, the user interface may be or include a dispenser 100, and user input devices 102 may include a paddle 102 and/or buttons 102. In other embodiments, various combinations are possible, e.g., the dryer appliance 10 of FIG. 1 may have a touch screen as in FIG. 2 or a touch pad 102 as in FIG. 3. The foregoing user input devices 102 are provided as examples only and are not limiting, various other user input devices 102 may be provided.

The user interface panel 100 may represent a general purpose Input/Output ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user.

The user interface panel 100 of the appliance 10 may be in communication with the controller 110 via, for example, one or more signal lines or shared communication busses. Input/Output ("I/O") signals may be routed between controller 110 and various operational components of the appliance 10. Operation of the appliance 10 can be regulated by the controller 110 that is operatively coupled to the user interface panel 100. A user interface panel 100 may for example provide selections for user manipulation of the operation of an appliance, e.g., via user input device 102. In response to user manipulation of the user interface panel 100 and/or user input device 102, the controller 110 may operate various components of the appliance 10. Controller 110 is a "processing device" or "controller" and may be embodied as described herein. Controller 110 may include a memory and one or more microprocessors, microcontrollers, application-specific integrated circuits (ASICS), CPUs or the like, such as general or special purpose microprocessors operable to execute programming instructions or micro-control code associated with operation of the appliance 10, and controller 110 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, a controller 110 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 110 may be programmed to operate the appliance 10 by executing instructions stored in memory. For example, the instructions may be software or any set of instructions that when executed by the processing device, cause the processing device to perform operations. Controller 110 can include one or more processor(s) and associated memory device(s) configured to perform a variety of computer-implemented functions and/or instructions (e.g. performing the methods, steps, calculations and the like and storing relevant data as disclosed herein). It should be noted that controllers 110 as disclosed herein are capable of and may be operable to perform any methods and associated method steps as disclosed herein.

The appliance 10, and in particular, controller 110 thereof, may be configured to communicate (e.g. using a wired or wireless connection) with a separate device external to the appliance, such as a communications device. The communications device may be a laptop computer, smartphone, tablet, personal computer, wearable device, smart home system, and/or various other suitable devices. The appliance 10 may be in communication with the separate communications device through various possible communication connections and interfaces. For purposes of the description herein, possible wired or wireless communication connections and interfaces can include, but are not limited to, wireless radio, WI-FI®, BLUETOOTH®, ZIGBEE®, laser, infrared, and Ethernet type devices and interfaces.

The separate device may include a memory for storing and retrieving programming instructions. Thus, some embodiments may include a remote user interface separate and apart from the appliance 10 itself, and the remote user interface may be an additional user interface to the user interface panel 100. For example, the separate device may be a smartphone operable to store and run applications, also known as "apps," and the remote user interface may be provided as a smartphone app.

The controller 110 may be configured to enable an operation restriction. The operation restriction may include limiting activation of the appliance 10 and may require an authorization prior to activating the appliance. For example, the required authorization may be provided via an authorization code. In some example embodiments, the authorization code may be entered via a remote user interface device. Example embodiments of the remote user interface device may include one or more of the above-described communications devices, such as a smart home system. In some embodiments, the authorization code may include a particular sequence, e.g., an alphanumeric sequence that may be entered in order to activate the appliance 10 when the operation restriction is enabled. In other embodiments, the authorization code may include any other series of inputs to the remote user interface device, such as a spoken code word provided to a smart home system, or a series of gestures, e.g., taps and/or swipes, on a smart phone. In additional embodiments, the authorization may simply be an affirmative response, e.g., "yes" or "allow," to a prompt for authorization. In such embodiments, the controller 110 may be configured to provide the prompt for authorization via the remote user interface on a separate device external to the appliance 10, e.g., an app on a smartphone, and the prompt for authorization may be a notification or text message sent to the smartphone. Further, the controller 110 may be configured to obtain a response to the prompt for authorization, e.g., the affirmative response described above.

However, in some instances, the remote user interface device may not be able to communicate the authorization to the appliance 10. For example, when the controller 110 is configured to communicate with the remote user interface device via WI-FI®, and the WI-FI® system is disrupted while the appliance 10 operation restrictions is enabled, the remote user interface device may not be able to communicate the authorization to the appliance 10. In such instances, an override key may be used to disable the operation restriction and activate the appliance 10. The override key may be entered via a local user interface. For example, the local user interface may be physically connected to the appliance, e.g., the user interface panel 100 and/or user input device 102. As another example, the local user interface may be connected wirelessly over a short-range communication, such as a local area network (LAN), infrared, or Bluetooth, for example when the primary user is unable to remotely (e.g., via Wi-Fi from a remote location) approve activation of the appliance 10. Thus, the appliance 10 may be activated without the authorization when the remote user interface device is unavailable or unable to communicate with the appliance 10. Some exemplary methods may include determining that the remote user interface device is unable to communicate with the appliance 10 and displaying the override key on the remote user interface device after determining that the remote user interface device is unable to communicate with the appliance 10. It should be noted that the absence of the remote user interface device is not a necessary precondition to use of the override key, e.g., in some embodiments the override key may be used regardless of whether or not the remote user interface device is able to communicate the authorization to the appliance 10.

For example, when the operation restriction is enabled such that activation of the appliance 10 is limited and an authorization is required, a request to activate the appliance 10 may be received by the controller 110, e.g., from user input device 102. In such case, the controller 110 may be configured to receive an override key via the user input device 102. The override key may be stored in a memory of the controller 110 prior to receiving the request to activate, such that when the controller 110 receives the override key from the user input device 102, the controller may be configured to compare the override key from the input device to the override key stored in memory, and the controller may be configured to determine whether the received key matches the stored key. After receiving the override key, the controller 110 may be configured to disable the operation restriction and activate the appliance 10.

In some embodiments, the above-described example controller 110 may further be configured to receive a new override key from a remote user interface device after disabling the operation restriction, store the new override key in the memory, and re-enable the operation restriction after receiving the new override key and storing the new override key in the memory. In some embodiments, the above-described example controller 110 may also or instead be further configured to send a notification that the override key has been received to a remote user interface device and provide a prompt to re-enable the operation restriction to the remote user interface device.

In various embodiments, the override key may be any form of input to the user interface panel 100 and/or user input device 102 unique to the particular type or model of appliance 10, such as turning a knob or pressing a button. For example, in an appliance 10 having a user input device 102 that includes buttons, the override key may utilize a single button or multiple buttons. For example, the override key may include pressing a single button repeatedly within a certain amount of time, e.g., pressing the button ten times in fifteen seconds. In another example, the override key may include a sequence or pattern of multiple button presses.

The override key may be stored in the appliance 10, and in particular in a memory of the controller 110. The override key may include a default key preprogrammed into the appliance 10 at the time of manufacture. The override key may be user-defined, e.g., the default override key, if any, may be replaced with a new override key defined by the user. In some embodiments, a new override key may be required each time the operation restriction is enabled or re-enabled. In some embodiments, the override key may be unique to the appliance 10. Providing a new and unique override key may advantageously provide enhanced security, e.g., the ability of an unauthorized user to obtain or reuse the override key without permission may be reduced or avoided.

In some embodiments, the default override key may be stored in a memory of a remote user interface device, and the controller 110 may be configured to receive the override key from the remote user interface device prior to enabling the operation restriction. Further, the user-defined override key may be defined via the remote user interface, and the appliance 10 may receive the user-defined override key from the remote user interface device prior to enabling or re-enabling the operation restriction. In other embodiments, the default override key and/or any new override key(s) may be defined using a user interface physically connected to the appliance and may be received by the controller 110 from the user interface physically connected to the appliance prior to enabling or re-enabling the operation restriction.

In some embodiments, the operation restriction may be enabled by receiving a restriction command prior to enabling the operation restriction. The restriction command may be received from a user interface physically connected to the appliance and/or may be received from a remote user interface device. Some embodiments may advantageously include receiving the override key prior to or with the restriction command and prior to enabling the operation restriction in order to ensure the availability of the override key once the operation of appliance 10 is restricted. This may be particularly advantageous when the restriction command is received from the remote user interface device and/or when a default override key is not provided.

Figure 5:
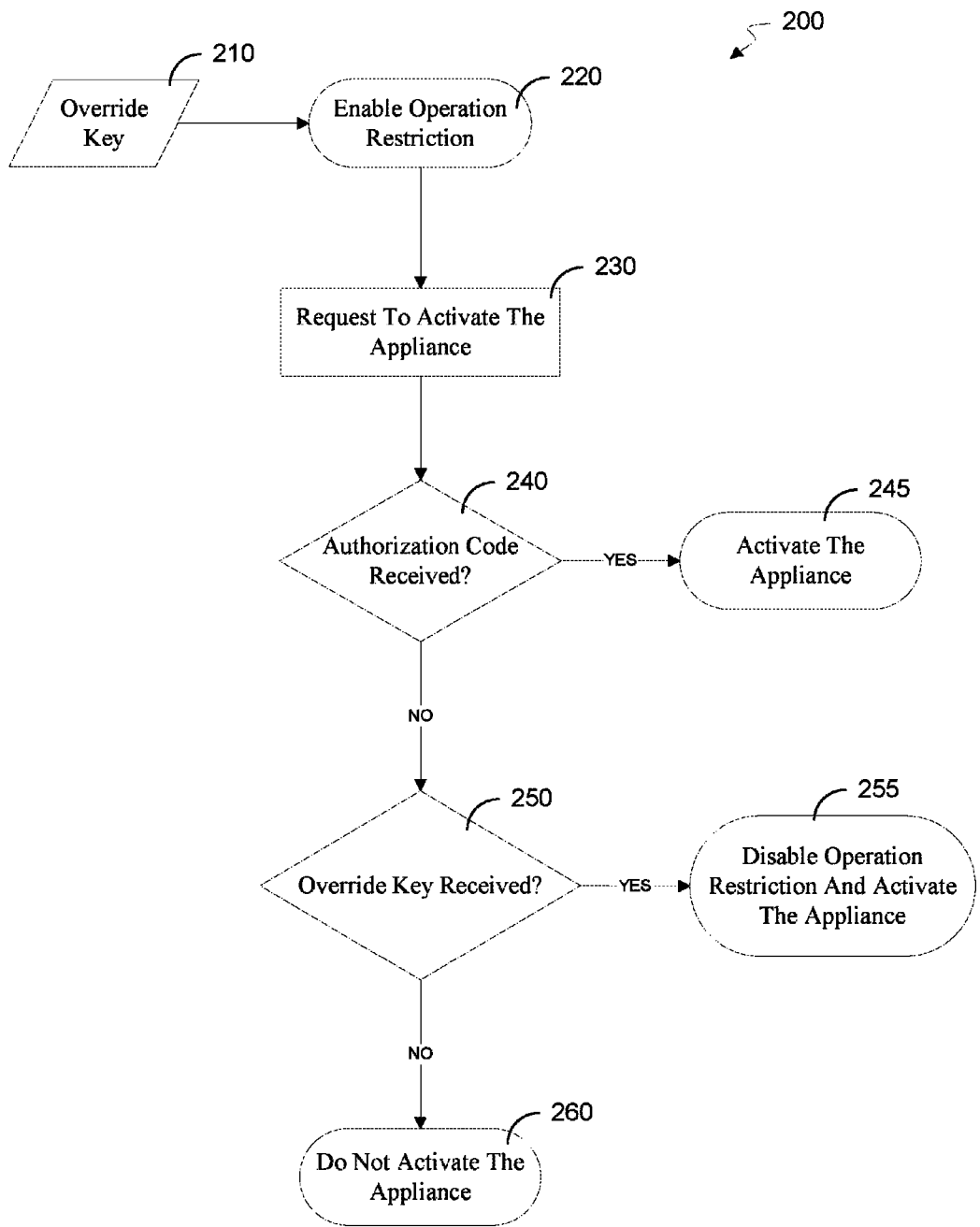
FIG. 5 is a flow chart illustrating a method of operating an appliance in accordance with embodiments of the present disclosure.

Some example embodiments, such as the illustration of FIG. 5, include a method 200 of operating an appliance 10. As illustrated, the method 200 first includes receiving the override key at 210 and enabling the operation restriction at 220. In some embodiments, receiving the override key 210 may be performed before enabling the operation restriction 220, or at the same time. However, in other embodiments, enabling the operation restriction 220 may be performed prior to receiving the override key 210.

Still with reference to FIG. 5, the example method 200 may further include receiving a request to activate the appliance 10 at step 230. In some embodiments, the request to activate the appliance 10 may be a remote request received without physical interaction between a user and the appliance 10, e.g., when the appliance 10 is an oven appliance, the remote request may include a remote request to preheat the oven 10. For example, the remote request may be initiated via a communications device such as a smartphone or a smart home system. In other embodiments, the request to activate the appliance 10 may be received via the user interface panel 100 and/or user input device 102.

Continuing to refer to FIG. 5, where the operation restriction is enabled such that an authorization is required prior to activating the appliance 10, some exemplary methods include determining whether an authorization has been received at step 240 and activating the appliance at step 245 when the authorization is received. Also illustrated in FIG. 5, some exemplary methods include a step 250 of determining whether an override key has been received. Step 250 may be performed after step 240, and in some embodiments, step 250 may only be performed when no authorization is received. The method 200 may further include a step 255 of disabling the operation restriction and activating the appliance 10 after receiving the override key or a step 260 of not activating the appliance 10 when the override key is not received.

In some embodiments, the step 240 of determining whether the authorization has been received may include providing a prompt for the authorization to a remote user interface on a separate device external to the appliance in response to the request to activate the appliance. Such embodiments may only perform the step 255 of disabling the operation restriction and activating the appliance 10 after the override key is received when no response to the prompt for the authorization is received.

In various embodiments wherein the override key is received and the operation restriction is disabled, the method may include one or more additional steps. For example, the method may also include sending a notification that the override key has been received to a remote user interface device. In instances where the appliance is not able to communicate with the remote user interface device at the time the override key is received, the notification may be sent when communications are restored. Further, the method may also or instead include providing a prompt to re-enable the operation restriction to the remote user interface device, either with the notification or independently of the notification. When the prompt to re-enable the operation restriction is provided, the method may also include receiving an affirmative response to the prompt to re-enable and re-enabling the operation restriction. In some embodiments, the method may also include receiving a new override key. The new override key may be received from a user interface physically connected to the appliance 10, such as user interface 104, or from a remote user interface, such as a smartphone.

In some embodiments, the operation restriction may be automatically re-enabled. For example, the method may include completing an operation cycle of the appliance 10 after activating the appliance and re-enabling the operation restriction after completing the operation cycle. In example embodiments where the appliance 10 is a dryer appliance, the operation cycle may include a timed drying cycle. In such embodiments, the request to activate the dryer appliance may include a request to initiate the timed drying cycle, and activating the dryer appliance 10 after receiving the override key may include completing the requested timed drying cycle. The example method may then include re-enabling the operation restriction after completing the timed drying cycle. As another example, the method may include disabling the operation restriction for a predetermined amount of time after receiving the override key, and may further include re-enabling the operation restriction after the predetermined amount of time.

In various embodiments, activating the appliance 10 after the override key is received may include full activation or limited activation. Full activation permits a user to operate the appliance 10 over its full range of capabilities and settings, whereas a limited or qualified activation permits the user to operate the appliance 10 over a limited range of its capabilities and settings. Limited activation and/or permitting limited operation may correspond to activating the appliance with limited operating capabilities such that only certain functions or operating ranges are active while other functions or operating ranges are deactivated, whereas permitting full operation of the appliance may include activating the appliance with its full range of operating capabilities and/or functions activated and available. As described in more detail below, in various exemplary embodiments, activating the appliance with limited operating capabilities means providing less than all of the appliance's possible functions, such as disabling high heat mode in a dryer appliance, and/or less than all of the appliance's possible operating ranges, such as limiting time or temperature settings in a cooking appliance.

For example, the request to activate the appliance 10 may include a request to activate the appliance at a first time parameter, and activating the appliance 10 after the override key is received may include permitting operation of the appliance 10 at a second, lower time parameter. As another example, in embodiments wherein the appliance 10 is a refrigeration appliance 10 as illustrated in FIG. 4 and is configured to dispense hot water, a requested operating parameter may include a request to dispense hot water, and activating the appliance 10 after the override key is received may include a limited activation, e.g., permitting water to be dispensed, but with a lower temperature parameter, e.g., cold water.

Various embodiments described herein include a limited activation option. Throughout such embodiments, the range of operating capabilities which are available in the limited activation mode may be predetermined or may be customizable via the remote user interface. In one example, where the appliance 10 is a dryer, providing limited activation may include permitting the dryer to operate only in a low-heat mode or an air fluff mode, e.g., with the heating assembly at a low setting or turned off. As is understood in the art, low-heat mode or a low setting for the heating assembly is defined in relation to the maximum or full capacity of heat production, i.e., low heat is less than the full amount of heat that could be provided by the heating assembly. In another example, where the appliance 10 is an oven, providing limited activation may include disabling one or more of the heating elements 32 on the cooktop 30 of the oven 10, up to and including disabling the cooktop 30 altogether, while permitting the oven 10 to heat the cooking chamber, or vice versa. For example, if the oven appliance includes digital control, disabling the cooktop 30 may include disabling a power supply to one or more burners on the cooktop 30. Additionally or in the alternative, activating the oven appliance 10 with limited operating capabilities may include heating the cooking chamber only to no more than a predetermined maximum temperature. In yet another example, where the appliance 10 is a microwave, providing limited activation of the microwave 10 may include permitting the microwave 10 to operate for no more than a predetermined maximum amount of time, e.g., one minute, two minutes, five minutes, or any other suitable maximum time. Additionally or in the alternative, activating the microwave 10 with limited operating capabilities may include permitting the microwave 10 to operate at no more than a predetermined maximum power level, e.g., fifty percent power, seventy-five percent power, or any other suitable maximum power. In any of the foregoing examples, limiting the range of operating capabilities may include providing only a single option for each user-selectable parameter. Thus, the limited activation option may provide specific configuration of the appliance 10. For example, where the appliance 10 is an oven appliance, activating the appliance 10 after the override key is received may include turning the oven ON and the available range of operating capabilities permitted by the remote user may include only a single temperature parameter and a single time parameter, e.g., only three hundred fifty degrees Fahrenheit (350° F.) for thirty minutes (30 min), such as when a premade meal is in the cooking chamber.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an appliance, the method comprising:
   receiving an override key stored in a memory of a remote user interface device from the remote user interface device;
   enabling an operation restriction after receiving the override key from the remote user interface device, the operation restriction limiting activation of the appliance and requiring an authorization prior to activating the appliance;
   receiving a request to activate the appliance;
   determining that the remote user interface device is unable to communicate with the appliance;
   displaying the override key on the remote user interface device after determining that the remote user interface device is unable to communicate with the appliance;
   receiving the override key via a local user interface;
   disabling the operation restriction after the override key is received; and
   activating the appliance after the override key is received.

2. The method of claim 1, wherein the override key is unique to the appliance.

3. The method of claim 1, further comprising sending a notification that the override key has been received to the remote user interface device.

4. The method of claim 1, further comprising providing a prompt to re-enable the operation restriction to the remote user interface device.

5. The method of claim 4, further comprising receiving an affirmative response to the prompt to re-enable, receiving a new override key, and re-enabling the operation restriction.

6. The method of claim 1, further comprising completing an operation cycle of the appliance after activating the appliance and re-enabling the operation restriction after completing the operation cycle.

7. The method of claim 1, further comprising receiving a restriction command prior to enabling the operation restriction.

8. The method of claim 7, wherein the restriction command is received from the remote user interface device.

9. The method of claim 1, further comprising providing a prompt for the authorization to a remote user interface on a separate device external to the appliance in response to the request to activate the appliance, and wherein the steps of disabling the operation restriction after the override key is received and activating the appliance after the override key is received are only performed when no response to the prompt for the authorization is received.

10. The method of claim 1, wherein activating the appliance after the override key is received comprises activating the appliance with limited operating capabilities.

11. The method of claim 1, wherein disabling the operation restriction comprises disabling the operation restriction for a predetermined amount of time after receiving the override key, and the method further comprises re-enabling the operation restriction after the predetermined amount of time.

12. The method of claim 1, further comprising receiving a new override key after activating the appliance.

13. The method of claim 12, further comprising re-enabling the operation restriction after receiving the new override key.

14. The method of claim 12, wherein the new override key is received from the remote user interface device, the method further comprising re-enabling the operation restriction after receiving the new override key from the remote user interface device.

15. An appliance, comprising:
   a local user interface;
   a controller in operative communication with the user interface, the controller comprising a memory, the controller configured to:
      receive a restriction command;
      store an override key in the memory;
      enable an operation restriction, the operation restriction limiting activation of the appliance and requiring an authorization prior to activating the appliance;
      receive a request to activate the appliance;
      send a prompt for the authorization to a remote user interface on a separate device external to the appliance in response to the request to activate the appliance;
      receive the override key from the local user interface;
      disable the operation restriction after the override key is received only when no response to the prompt for the authorization is received; and
      activate the appliance after the override key is received only when no response to the prompt for the authorization is received.

16. The appliance of claim 15, wherein the controller is further configured to receive a new override key from a remote user interface device after disabling the operation restriction, store the new override key in the memory, and re-enable the operation restriction after storing the new override key in the memory.

17. The appliance of claim 15, wherein the controller is further configured to send a notification that the override key has been received to a remote user interface device and provide a prompt to re-enable the operation restriction to the remote user interface device.

* * * * *